M. E. OWENS.
NUT LOCK.
APPLICATION FILED MAY 10, 1917.

1,262,242.

Patented Apr. 9, 1918.

Inventor
M. E. OWENS

By H. S. Hill
Attorney

UNITED STATES PATENT OFFICE.

MOSES EARL OWENS, OF SOUTHMONT, NORTH CAROLINA.

NUT-LOCK.

1,262,242. Specification of Letters Patent. Patented Apr. 9, 1918.

Application filed May 10, 1917. Serial No. 167,698.

*To all whom it may concern:*

Be it known that I, MOSES EARL OWENS, a citizen of the United States, residing at Southmont, in the county of Davidson, State of North Carolina, have invented a new and useful Nut-Lock; and I do hereby declare the following to be a full, clear, and exact description of the invention, such as will enable others skilled in the art to which it appertains to make and use the same.

The present invention relates to a nut and bolt lock, and has for its object to provide a device of this character which embodies novel features of construction whereby the nut and bolt can be positively locked against relative rotation, thereby preventing the nut from working loose even though the device may be subjected to continuous vibration.

Further objects of the invention are to provide a nut and bolt lock which is comparatively simple and inexpensive in its construction, which can be used repeatedly, since the nut can be unscrewed from the bolt at any time without injury thereto, which is free from delicate parts and is not liable to break or get out of repair, and which will render it practically impossible for the nut or bolt to work loose even under the most severe conditions of use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
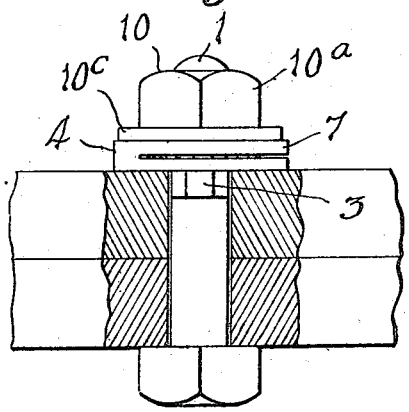
Figure 1 is a side elevation of a nut lock constructed in accordance with the invention.
Figure 2:
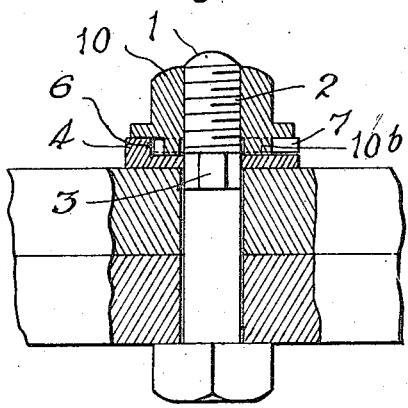
Fig. 2 is a similar view with the nut and washer shown in section.
Figure 3:
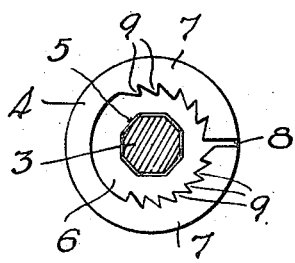
Fig. 3 is a top plan view of the washer.
Figure 4:
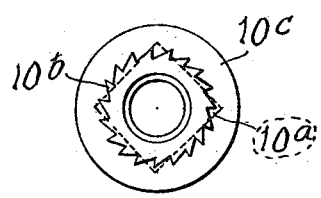
Fig. 4 is a bottom plan view of the nut.
Figure 5:
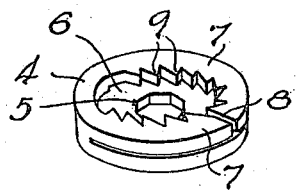
Fig. 5 is a detail perspective view of the washer.

Referring to the drawings, which illustrate one embodiment of the invention, the numeral 1 designates a bolt which has the usual threaded end 2 and has a slightly enlarged polygonal portion 3 below the threaded end 2 thereof, the angular corners of the polygonal portion projecting beyond the sides of the bolt, while the middle portions of the sides thereof are flush with the sides of the bolt. A washer member 4 is slipped upon the bolt 1, being formed with a polygonal opening 5 which corresponds to the polygonal portion 3 of the bolt and interlocks therewith to hold the washer against rotation upon the bolt. The outer face of the washer member is recessed at 6, the side walls of the recess being cut-away from the body portion of the washer member 4 at one side thereof to provide a pair of oppositely extending curved arms 7, the free ends of which may loosely abut against each other or have a slightly spaced relation, as indicated at 8. The inner faces of these resilient curved arms 7 are provided with ratchet teeth 9. The nut 10 is threaded for engagement with the end 2 of the bolt in the usual manner, the outer end $10^a$ of the nut having a polygonal formation so as to be readily engaged by a wrench or like tool when screwing the nut into or out of position, while the base of the nut is formed with a reduced end portion $10^b$ adapted to be received within the recess 6 of the washer member 4, and having a toothed peripheral portion arranged for engagement by the ratchet teeth 9 of the arm 7 of the washer member to lock the nut against backward rotation. A flange $10^c$ is shown in the present instance as arranged at the base of the polygonal outer end $10^a$ of the nut so as to extend over the recess 6 of the washer member and exclude dust and dirt therefrom. When screwing the nut 10 into or out of position, a screw driver or like tool is inserted between the free ends of the resilient arm 7 and the latter sprung apart to move the ratchet teeth 9 into inoperative position. When the nut 10 has been properly tightened, the screw-driver or other tool is withdrawn from between the free ends of the resilient arms 7 and the latter permitted to spring back into operative position. The ratchet teeth 9 thereof then engage the corresponding ratchet teeth of the reduced inner end $10^b$ of the nut and coöperate therewith to lock the nut positively against backward rotation. Before the nut can be removed it is necessary to again pry the free ends of the resilient arms 7 apart by a screw-driver or like tool and disengage the teeth 9 of the said arms from the ratchet of the nut.

Having thus described the invention, what I claim as new and desire to secure by Letters Patent, is:—

1. The combination with a bolt having a threaded end, a washer member slidable upon the bolt but locked against rotation thereon, said washer member being formed in the outer face thereof with a recess having oppositely extending peripheral arms at the sides thereof, the inner sides of the arms being toothed and the arms being adapted to be sprung outwardly into inoperative position by prying the free ends thereof apart, and a nut threaded upon the bolt and formed with a toothed inner end arranged to be received within the recess of the washer member and engaged by the teeth of the spring arms thereof to lock the nut against backward rotation.

2. The combination with a bolt having a threaded end, a washer member slidable on the bolt but locked against rotation thereon, said washer member being provided in the outer face thereof with a recess which is inclosed at one side thereof by oppositely extending curved peripheral arms, the inner sides of the arms being toothed and the arms being adapted to be sprung outwardly into inoperative position by prying the free ends thereof apart, and a nut threaded upon the bolt and formed with a reduced inner end adapted to be received within the recess of the washer member, said reduced inner end of the nut having teeth at its periphery for engagement with the teeth of the spring arms of the washer member to lock the nut against backward rotation.

In testimony whereof I have signed my name to this specification in the presence of two subscribing witnesses.

MOSES EARL OWENS.

Witnesses:
HENRY BOSSET,
HENRY BOEDE.

Copies of this patent may be obtained for five cents each, by addressing the "Commissioner of Patents, Washington, D. C."